(12) United States Patent
Holness (10) Patent No.: US 11,444,807 B2
(45) Date of Patent: Sep. 13, 2022

(54) EVPN VPWS FXC LOCAL SWITCHING CONNECTIVITY

(71) Applicant: Ciena Corporation, Hanover, MD (US)

(72) Inventor: Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 25 days.

(21) Appl. No.: 16/749,008

(22) Filed: Jan. 22, 2020

(65) Prior Publication Data
US 2021/0226816 A1 Jul. 22, 2021

(51) Int. Cl.
| | |
|---|---|
| H04L 12/46 | (2006.01) |
| H04L 45/24 | (2022.01) |
| H04L 45/28 | (2022.01) |
| H04L 45/50 | (2022.01) |
| H04L 45/00 | (2022.01) |

(52) U.S. Cl.
CPC ........ *H04L 12/4641* (2013.01); *H04L 45/245* (2013.01); *H04L 45/28* (2013.01); *H04L 45/50* (2013.01); *H04L 45/66* (2013.01)

(58) Field of Classification Search
CPC ... H04L 12/4641; H04L 45/245; H04L 45/28; H04L 45/50; H04L 45/66; Y02D 30/00; Y02D 30/50
See application file for complete search history.

(56) References Cited

U.S. PATENT DOCUMENTS

| | | | |
|---|---|---|---|
| 7,590,054 B1 | 9/2009 | Holness et al. | |
| 7,792,044 B2 | 9/2010 | Holness et al. | |
| 7,924,725 B2 | 4/2011 | Mohan et al. | |
| 8,018,841 B2 | 9/2011 | Holness et al. | |
| 8,085,676 B2 | 12/2011 | Skalecki et al. | |
| 8,149,692 B2 | 4/2012 | Holness et al. | |
| 8,243,743 B2 | 8/2012 | Martin et al. | |
| 8,295,175 B2 | 10/2012 | Ellis et al. | |
| 8,305,938 B2 | 11/2012 | Holness et al. | |
| 8,509,061 B2 | 8/2013 | Holness et al. | |
| 8,588,060 B2 | 11/2013 | Holness | |
| 8,625,410 B2 | 1/2014 | Abdullah et al. | |
| 8,737,198 B1 | 5/2014 | Holness et al. | |
| 8,787,147 B2 | 7/2014 | Caird et al. | |
| 8,787,149 B1 | 7/2014 | Ramanathan et al. | |
| 8,787,398 B2 | 7/2014 | Holness et al. | |

(Continued)

OTHER PUBLICATIONS

Sajassi et al., EVPN VPWS Flexible Cross-Connect Service draft-ietf-bess-evpn-vpws-fxc-01.txt, Internet-Draft, Standards Track, Jun. 6, 2019, pp. 1-16.

(Continued)

*Primary Examiner* — Donald L Mills
(74) *Attorney, Agent, or Firm* — Clements Bernard Baratta; Lawrence A. Baratta, Jr.; Christopher L. Bernard (57) ABSTRACT

A network element configured to implement an Ethernet Virtual Private Network (EVPN) Virtual Private Wire Service (VPWS) Flexible Cross-Connect (FXC) local switching service includes a plurality of ports; and a switching fabric configured to switch traffic between the plurality of ports; wherein a set of ports is configured in a distributed Link Aggregation Group (LAG) with two nodes, and an inter-chassis link configured with a second network element, and wherein, responsive to a failure of the inter-chassis link, a distribution state of members in the distributed LAG is coordinated.

20 Claims, 8 Drawing Sheets

(56) References Cited

U.S. PATENT DOCUMENTS

| | | | |
|---|---|---|---|
| 8,797,845 B2 | 8/2014 | Ryoo et al. | |
| 8,855,122 B2 | 10/2014 | Bottorff | |
| 9,025,435 B2 | 5/2015 | Holness et al. | |
| 9,036,641 B2 | 5/2015 | Allan et al. | |
| 9,075,717 B2 | 7/2015 | Mohan, Jr. et al. | |
| 9,197,493 B2 | 11/2015 | Holness et al. | |
| 9,203,549 B2 | 12/2015 | Holness et al. | |
| 9,203,644 B2 | 12/2015 | Holness et al. | |
| 9,264,328 B2 | 2/2016 | Hu et al. | |
| 9,319,268 B2 | 4/2016 | Allan et al. | |
| 9,344,323 B2 | 5/2016 | Civil et al. | |
| 9,401,817 B2 | 7/2016 | Holness et al. | |
| 9,781,048 B2 | 10/2017 | Holness et al. | |
| 9,893,937 B2 | 2/2018 | Holness et al. | |
| 9,960,993 B2 | 5/2018 | Hu et al. | |
| 10,122,619 B2 | 11/2018 | Holness et al. | |
| 10,193,765 B2 | 1/2019 | Holness et al. | |
| 10,212,075 B1* | 2/2019 | Lakshmikanthan | H04L 12/413 |
| 10,263,867 B2 | 4/2019 | Holness et al. | |
| 10,277,493 B2 | 4/2019 | Holness | |
| 10,291,509 B2 | 5/2019 | Holness | |
| 10,425,153 B2 | 9/2019 | Holness et al. | |
| 10,476,763 B2 | 11/2019 | Holness | |
| 10,644,987 B1* | 5/2020 | Lin | H04L 12/462 |
| 2005/0068950 A1 | 3/2005 | Ellis et al. | |
| 2005/0071453 A1 | 3/2005 | Ellis et al. | |
| 2005/0099949 A1 | 5/2005 | Mohan et al. | |
| 2005/0099951 A1 | 5/2005 | Mohan et al. | |
| 2005/0099954 A1 | 5/2005 | Mohan et al. | |
| 2005/0099955 A1 | 5/2005 | Mohan et al. | |
| 2007/0064700 A1 | 3/2007 | Holness | |
| 2007/0268817 A1 | 11/2007 | Smallegange et al. | |
| 2010/0135291 A1 | 6/2010 | Martin et al. | |
| 2012/0207171 A1* | 8/2012 | Ould Brahim | H04L 12/4654 370/395.53 |
| 2015/0006757 A1* | 1/2015 | Boutros | H04L 12/4641 709/242 |
| 2016/0352570 A1 | 12/2016 | Holness | |
| 2018/0294969 A1 | 10/2018 | Holness | |
| 2018/0375763 A1* | 12/2018 | Brissette | H04L 49/35 |
| 2019/0319875 A1* | 10/2019 | Muthukaruppan | H04L 45/245 |

OTHER PUBLICATIONS

Sajassi et al., BGP MPLS-Based Ethernet VPN, Internet Engineering Task Force (IETF), Standards Track, ISSN: 2070-1721, Feb. 2015, pp. 1-56.

Boutros et al., Virtual Private Wire Service Support in Ethernet VPN, Internet Engineering Task Force (IEFT), Standards Track, ISSN: 2070-1721, Aug. 2017, pp. 1-17.

Jun. 18, 2021, European Search Report for European Patent Application No. EP 21 15 2164.

* cited by examiner

EVPN VPWS FXC LOCAL SWITCHING CONNECTIVITY

FIELD OF THE DISCLOSURE

The present disclosure generally relates to networking. More particularly, the present disclosure relates to systems and methods to improve Ethernet Virtual Private Network (EVPN) Virtual Private Wire Service (VPWS) Flexible Cross-Connect (FXC) local switching connectivity.

BACKGROUND OF THE DISCLOSURE

EVPN is described in RFC 7432, "BGP MPLS-Based Ethernet VPN," the contents of which are incorporated herein by reference. VPWS is described in RFC 8214, "Virtual Private Wire Service Support in Ethernet VPN," August 2017, the contents of which are incorporated herein by reference. A new EVPN VPWS service type, referred to as a Flexible Cross-Connect (FXC) service, is designed for multiplexing multiple Attachment Circuits (ACs) across different Ethernet Segments and physical interfaces into a single EVPN VPWS service tunnel and still provide (single-active and all-active) multi-homing. This new service is currently described in IETF draft draft-ietf-bess-evpn-vpws-fxc-01, "EVPN VPWS Flexible Cross-Connect Service," June 2019, the contents of which are incorporated herein by reference. One of the tenants of this new service is that when a cross-connect is between two ACs belonging to two multi-homed Ethernet Segments on the same set of multi-home Provider Edge (PEs) nodes, then forwarding between the two ACs must be performed locally during normal operation.

Of note, there are outstanding failure scenarios where reachability between client devices that are locally switched is not maintained. This present disclosure addresses this problem, making the application of EVPN FXC and local switching more robust for network deployments.

BRIEF SUMMARY OF THE DISCLOSURE

The present disclosure relates to systems and methods to improve Ethernet Virtual Private Network (EVPN) Virtual Private Wire Service (VPWS) Flexible Cross-Connect (FXC) local switching connectivity. The present disclosure links the state of multiple attachment circuits in different EVPN VPWS Ethernet Segments, that share a common VPWS service instance (e.g., denoted by a normalized Virtual Local Area Network (VLAN) identifier (VID)), if an inter-chassis Provider Edge (PE) network link fails. Doing this ensures that client traffic supported by the Service Provider's EVPN can have their service successfully restored, providing a more robust EVPN VPWS FXC approach.

In an embodiment, a network element is configured to implement an Ethernet Virtual Private Network (EVPN) Virtual Private Wire Service (VPWS) Flexible Cross-Connect (FXC) local switching service. The network element includes a plurality of ports; and a switching fabric configured to switch traffic between the plurality of ports; wherein a set of ports is configured in a distributed Link Aggregation Group (LAG) with two nodes, and an inter-chassis link is configured with a second network element, and wherein, responsive to a failure of the inter-chassis link, a distribution state of members in the distributed LAG is coordinated. The distribution state can be coordinated based on detection of a member being out-of-distribution. The distribution state can be coordinated based on detection of a member being out-of-distribution such that if one member of an Ethernet Segment Instance (ESI) being out-of-distribution causes another member with another ESI in a common VPWS to change to being out-of-distribution. The common VPWS can be based on a normalized Virtual Local Area Network (VLAN) Identifier (VID). The failure of the inter-chassis link can be subsequent to a fault affecting a port in the set of ports, where recovery occurs based on the distributed LAG. The recovery occurs based on the distributed LAG via withdrawal of Ethernet Auto Discovery (AD) routes. Subsequent to the fault and the failure, corresponding traffic can be locally switched between the two nodes.

In another embodiment, a method is implemented by a network element configured to implement an Ethernet Virtual Private Network (EVPN) Virtual Private Wire Service (VPWS) Flexible Cross-Connect (FXC) local switching service. The method includes operating a set of ports in a distributed Link Aggregation Group (LAG) with two nodes; operating an inter-chassis link with a second network element; and, responsive to a failure of the inter-chassis link, coordinating a distribution state of members in the distributed LAG. The distribution state can be coordinated based on detection of a member being out-of-distribution. The distribution state can be coordinated based on detection of a member being out-of-distribution such that if one member of an Ethernet Segment Instance (ESI) being out-of-distribution causes another member with another ESI in a common VPWS to change to being out-of-distribution. The common VPWS can be based on a normalized Virtual Local Area Network (VLAN) Identifier (VID). The failure of the inter-chassis link can be subsequent to a fault affecting a port in the set of ports, where recovery occurs based on the distributed LAG. The recovery occurs based on the distributed LAG via withdrawal of Ethernet Auto Discovery (AD) routes. Subsequent to the fault and the failure, corresponding traffic can be locally switched between the two nodes.

In a further embodiment, a network is configured to implement an Ethernet Virtual Private Network (EVPN) Virtual Private Wire Service (VPWS) Flexible Cross-Connect (FXC) local switching service. The network includes a first network element and a second network element each in a distributed Link Aggregation Group (LAG), and with an inter-chassis link between the first network element and the second network element, wherein, responsive to a failure of the inter-chassis link, a distribution state of members in the distributed LAG is coordinated. The distribution state can be coordinated based on detection of a member being out-of-distribution. The distribution state can be coordinated based on detection of a member being out-of-distribution such that if one member of an Ethernet Segment Instance (ESI) being out-of-distribution causes another member with another ESI in a common VPWS to change to being out-of-distribution. The common VPWS can be based on a normalized Virtual Local Area Network (VLAN) Identifier (VID). The failure of the inter-chassis link can be subsequent to a fault affecting a port in the distributed LAG, where recovery occurs based on the distributed LAG. The recovery occurs based on the distributed LAG via withdrawal of Ethernet Auto Discovery (AD) routes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods to improve Ethernet Virtual Private Network (EVPN) Virtual Private Wire Service (VPWS) Flexible Cross-Connect (FXC) local switching connectivity. The present disclosure links the state of multiple attachment circuits in different EVPN VPWS Ethernet Segments, that share a common VPWS service instance (e.g., denoted by a normalized Virtual Local Area Network (VLAN) identifier (VID)), if an inter-chassis Provider Edge (PE) network link fails. Doing this ensures that client traffic supported by the Service Provider's EVPN can have their service successfully restored, providing a more robust EVPN VPWS FXC approach.

EVPN VPWS FXC

VPWS [RFC8214] describes a solution to deliver Point-to-Point (P2P) services using Border Gateway Protocol (BGP) constructs for EVPN defined in [RFC7432]. VPWS delivers this P2P service between a pair of Attachment Circuits (ACs), where an AC can designate on a PE, a port, a VLAN on a port, or a group of VLANs on a port. It also leverages multi-homing and fast convergence capabilities of [RFC7432] in delivering these VPWS services. Multi-homing capabilities include the support of single-active and all-active redundancy mode, and fast convergence is provided using a "mass withdraw" message in control-plane and fast protection switching using prefix independent convergence in data-plane upon node or link failure [BGP-PIC]. Furthermore, the use of EVPN BGP constructs eliminates the need for multi-segment Pseudowire (PW) auto-discovery and signaling if the VPWS service needs to span across multiple Autonomous Systems (AS).

Some service providers have a very large number of ACs (in millions) that need to be backhauled across their MPLS/IP network. These ACs may or may not require tag manipulation (e.g., VLAN translation). These service providers want to multiplex a large number of ACs across several physical interfaces spread across one or more PEs (e.g., several Ethernet Segments) onto a single VPWS service tunnel in order to a) reduce number of EVPN service labels associated with EVPN-VPWS service tunnels and thus the associated Operations, Administration, and Management (OAM) monitoring, and b) reduce EVPN BGP signaling (e.g., not to signal each AC as it is the case in [RFC8214]).

EVPN VPWS FXC provides the above functionality without scarifying any of the capabilities of [RFC8214] including single-active and all-active multi-homing, and fast convergence.

Two of the main motivations for service providers seeking a new solution are: 1) to reduce the number of VPWS service tunnels by multiplexing large number of ACs across different physical interfaces instead of having one VPWS service tunnel per AC, and 2) to reduce the signaling of ACs as much as possible. Besides these two requirements, they also want multi-homing and fast convergence capabilities of [RFC8214].

In [RFC8214], a PE signals an AC indirectly by first associating that AC to a VPWS service tunnel (e.g., a VPWS service instance) and then signaling the VPWS service tunnel via a per-EVPN Instance (EVI) Ethernet Auto-Discovery (AD) route with Ethernet Tag field set to a 24-bit VPWS service instance identifier (which is unique within the EVI) and Ethernet Segment Instance (ESI) field set to a 10-octet identifier of the Ethernet Segment corresponding to that AC.

Therefore, a PE device that receives such EVPN routes, can associate the VPWS service tunnel to the remote Ethernet Segment (ES), and when the remote ES fails, and the PE receives the "mass withdraw" message associated with the failed ES per [RFC7432], it can update its BGP path list for that VPWS service tunnel quickly and achieve fast convergence for multi-homing scenarios. Even if fast convergence was not needed, there would still be a need for signaling each AC failure (via its corresponding VPWS service tunnel) associated with the failed ES, so that the BGP path list for each of them gets updated accordingly, and the packets are sent to backup PE (in case of single-active multi-homing) or to other PEs in the redundancy group (in case of all-active multi-homing). In absence of updating the BGP path list, the traffic for that VPWS service tunnel will be black-holed.

When a single VPWS service tunnel multiplexes many ACs across number of Ethernet Segments (number of physical interfaces) and the ACs are not signaled via EVPN BGP to remote PE devices, then the remote PE devices neither know the association of the received Ethernet Segment to these ACs (and in turn to their local ACs) nor they know the association of the VPWS service tunnel (e.g., EVPN service label) to the far-end ACs—i.e., the remote PEs only know the association of their local ACs to the VPWS service tunnel but not the far-end ACs. Thus, upon a connectivity failure to the ES, they don't know how to redirect traffic via another multi-homing PE to that ES. In other words, even if an ES failure is signaled via EVPN to the remote PE devices, they don't know what to do with such message because they do not know the association among the remote ES, the remote ACs, and the VPWS service tunnel.

In order to address this issue when multiplexing a large number of ACs onto a single VPWS service tunnel, two mechanisms are devised: one to support VPWS services between two single-homed endpoints and another one to support VPWS services where one of the endpoints is multi-homed. An endpoint can be an AC, Media Access Control-Virtual Routing and Forwarding (MAC-VRF), Internet Protocol-VRF (IP-VRF), global table, etc.

For single-homed endpoints, it is OK not to signal each AC in BGP because upon connection failure to the ES, there is no alternative path to that endpoint. However, the ramification for not signaling an AC failure is that the traffic destined to the failed AC is sent over MPLS/IP core and then gets discarded at the destination PE—i.e., it can waste network resources. However, when there is a connection failure, the application layer will eventually stop sending traffic, and thus this wastage of network resources should be transient.

Solution

This section describes a solution for providing a new VPWS service between two PE devices where a large number of ACs (e.g., VLANs) that span across many Ethernet Segments (i.e., physical interfaces) on each PE are multiplex onto a single P2P EVPN service tunnel. Since multiplexing is done across several physical interfaces, there can be overlapping VLAN IDs across these interfaces; therefore, in such scenarios, the VLAN IDs (VIDs) must be translated into unique VIDs to avoid a collision. Furthermore, if the number of VLANs that are getting multiplexed onto a single VPWS service tunnel exceeds 4K, then a single tag to double tag translation must be performed. This translation of VIDs into unique VIDs (either single or double) is referred to as "VID normalization." When single normalized VID is used, the lower 12-bit of Ethernet tag field in EVPN routes is set to that VID, and when double normalized VID is used, the lower 12-bit of Ethernet tag field is set to inner VID, and the higher 12-bit is set to the outer VID.

Since there is only a single EVPN VPWS service tunnel associated with many normalized VIDs (either single or double) across multiple physical interfaces, MPLS lookup at the disposition PE is no longer sufficient to forward the packet to the right egress endpoint/interface. Therefore, in addition to an EVPN label lookup corresponding to the VPWS service tunnel, a VID lookup (either single or double) is also required. On the disposition PE, one can think of the lookup of EVPN label results in the identification of a VID-VRF, and the lookup of normalized VID(s) in that table results in identification of egress endpoint/interface. The tag manipulation (translation from normalized VID(s) to local VID) can be performed either as part of the VID table lookup or at the egress interface itself.

Since VID lookup (single or double) needs to be performed at the disposition PE, then VID normalization MUST be performed prior to the MPLS encapsulation on the ingress PE. This requires that both imposition and disposition PE devices be capable of VLAN tag manipulation, such as re-write (single or double), addition, deletion (single or double) at their endpoints (e.g., their ES's, MAC-VRFs, IP-VRFs, etc.).

FXC

In this mode of operation, many ACs across several Ethernet Segments are multiplexed into a single EVPN VPWS service tunnel represented by a single VPWS service ID. This is the default mode of operation for FXC, and the participating PEs do not need to signal the VLANs (normalized VIDs) in EVPN BGP.

With respect to the data-plane aspects of the solution, both imposition and disposition PEs are aware of the VLANs as the imposition PE performs VID normalization, and the disposition PE does VID lookup and translation. In this solution, there is only a single P2P EVPN VPWS service tunnel between a pair of PEs for a set of ACs.

Since the EVPN VPWS service tunnel is used to multiplex ACs across different ES's (e.g., physical interfaces), the EVPN label alone is not sufficient for proper forwarding of the received packets (over MPLS/IP network) to egress interfaces. Therefore, normalized VID lookup is required in the disposition direction to forward packets to their proper egress end-points—i.e., the EVPN label lookup identifies a VID-VRF, and subsequently, the normalized VID lookup in that table, identifies the egress interface.

This mode of operation is only suitable for single-homing because in multi-homing the association between EVPN VPWS service tunnel and remote AC changes during the failure and therefore the VLANs (normalized VIDs) need to be signaled.

In this solution, on each PE, the single-homing ACs represented by their normalized VIDs are associated with a single EVPN VPWS service tunnel (in a given EVI). The EVPN route that gets generated is an EVPN Ethernet AD per EVI route with ESI=0, Ethernet Tag field set to VPWS service instance ID, MPLS label field set to dynamically generated EVPN service label representing the EVPN VPWS service tunnel. This route is sent with a Route Target (RT) representing the EVI. This RT can be auto-generated from the EVI. Furthermore, this route is sent with the EVPN Layer-2 Extended Community defined in [RFC8214] with two new flags that indicate: 1) this VPWS service tunnel is for default Flexible Cross-Connect, and 2) normalized VID type (single versus double). The receiving PE uses these new flags for consistency checks and may generate an alarm if it detects inconsistency but does not bring down the VPWS service.

It should be noted that in this mode of operation, a single Ethernet AD per EVI route is sent upon the configuration of the first AC (i.e., normalized VID). Later, when additional ACs are configured and associated with this EVPN VPWS service tunnel, the PE does not advertise any additional EVPN BGP routes. The PE only associates these ACs locally with the already created VPWS service tunnel.

The default FXC mode can be used for multi-homing. In this mode, a group of normalized VIDs (ACs) on a single Ethernet segment that are destined to a single endpoint are multiplexed into a single EVPN VPWS service tunnel represented by a single VPWS service ID. When the default FXC mode is used for multi-homing, instead of a single EVPN VPWS service tunnel, there can be many service tunnels per pair of PEs—i.e., there is one tunnel per group of VIDs per pair of PEs, and there can be many groups between a pair of PEs, thus resulting in many EVPN service tunnels.

VLAN-Signaled FXC

In this mode of operation, just as the default FXC mode defined above, many normalized VIDs (ACs) across several different ES's/interfaces are multiplexed into a single EVPN VPWS service tunnel; however, this single tunnel is represented by many VPWS service IDs (one per normalized VID), and these normalized VIDs are signaled using EVPN BGP.

In this solution, on each PE, the multi-homing ACs represented by their normalized VIDs are configured with a single EVI. There is no need to configure VPWS service instance ID in here as it is the same as the normalized VID. For each normalized VID on each ES, the PE generates an EVPN Ethernet AD per EVI route where ESI field represents the ES ID, the Ethernet Tag field is set to the normalized VID, MPLS label field is set to dynamically generated EVPN label representing the P2P EVPN service tunnel and it is the same label for all the ACs that are multiplexed into a single EVPN VPWS service tunnel. This route is sent with an RT representing the EVI. As before, this RT can be auto-generated from the EVI. Furthermore, this route is sent with the EVPN Layer-2 Extended Community defined [RFC8214] with two new flags that indicate: 1) this VPWS service tunnel is for VLAN-signaled Flexible Cross-Connect, and 2) normalized VID type (single versus double). The receiving PE uses these new flags for consistency check and MAY generate an alarm if it detects inconsistency but doesn't bring down the VPWS service.

It should be noted that in this mode of operation, the PE sends a single Ethernet AD route for each AC that is configured—i.e., each normalized VID that is configured per ES results in the generation of an EVPN Ethernet AD per EVI.

This mode of operation provides automatic cross-checking of normalized VIDs used for EVPL services because these VIDs are signaled in EVPN BGP. For example, if the same normalized VID is configured on three PE devices (instead of two) for the same EVI, then when a PE receives the second EVPN EAD per-EVI route, it generates an error message unless the two EVPN EAD per-EVI routes include the same ESI. Such cross-checking is not feasible in default FXC mode because the normalized VIDs are not signaled.

Local Switching

When cross-connection is between two ACs belonging to two multi-homed Ethernet Segments on the same set of multi-homing PEs, then forwarding between the two ACs MUST be performed locally during normal operation (e.g., in absence of a local link failure)—i.e., the traffic between the two ACs MUST be locally switched within the PE.

In terms of control plane processing, this means that when the receiving PE receives an Ethernet AD per-EVI route whose ESI is a local ESI, the PE does not alter its forwarding state based on the received route. This ensures that the local switching takes precedence over forwarding via the MPLS/IP network. This scheme of locally switched preference is consistent with baseline EVPN [RFC 7432] where it describes the locally switched preference for MAC/IP routes.

In such scenarios, the Ethernet AD per EVI route should be advertised with the MPLS label either associated with the destination Attachment Circuit or with the destination Ethernet Segment in order to avoid any ambiguity in forwarding. In other words, the MPLS label cannot represent the same VID-VRF described above because the same normalized VID can be reachable via two Ethernet Segments. In case of using MPLS label per destination AC, then this same solution can be used for VLAN-based VPWS or VLAN-bundle VPWS services per [RFC8214].

EVPN VPWS FXC Local Switching

Figure 1:
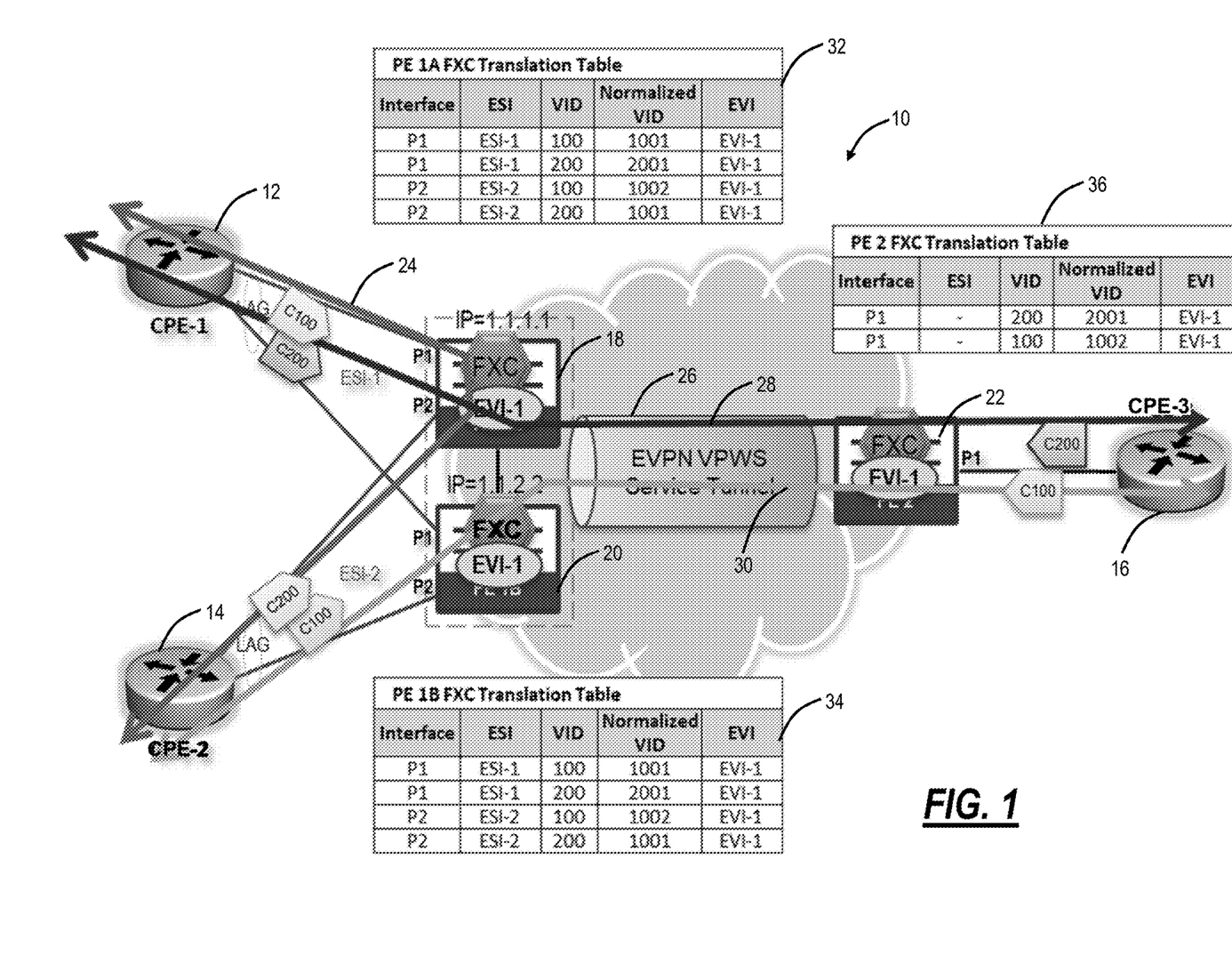
FIG. 1 is a network diagram of a network illustrating expected behavior (no failures) for EVPN VPWS FXC local switching.

FIG. 1 is a network diagram of a network 10 illustrating expected behavior (no failures) for EVPN VPWS FXC local switching. The network 10 includes three Customer Premises Equipment (CPE) nodes 12, 14 that connect to a Customer Edge (CE) node 16, via Provider Edge (PE) nodes PE1A 18, PE1B 20, PE2 22. The CPE nodes 12, 14 connect via local switching via a connection 24 where the CPE node 12 connects to a port P1 on the PE1A 18, and the CPE node 14 connects to a port P2 on the PE1B 20. The CPE node 12 connects to the CE node 16 via a service tunnel 26 and a connection 28 therein. The CPE node 14 connects to the CE node 16 via the service tunnel 26 and a connection 30 therein.

FIG. 1 includes translation tables 32, 34, 36, which illustrate the FXC translations between interfaces, ESI, VID, normalized VID, and EVI at each of the PE nodes PE1A 18, PE1B 20, PE2 22. In FIG. 1, the local traffic between the CPE nodes 12, 14 (attachment circuits) is locally switched within the PE1A 18. The local switching takes precedence over forwarding via the MPLS/IP network.

There are Link Aggregation Groups (LAGs) configured between the CPE nodes 12, 14, and the nodes PE1A 18, PE1B 20. In this example, the CPE node 12 can have two LAG members—one connected to the node PE1A 18 and one connected to the node PE1B 20, and similarly, the CPE node 14 can have two LAG members—one connected to the node PE1A 18 and one connected to the node PE1B 20. The CPE nodes 12, 14 can be in a distributed LAG, such as a Multi-Chassis LAG (MC-LAG), each with the node PE1A 18, PE1B 20. One aspect of the distributed LAG is an inter-PE link between the nodes PE1A 18, PE1B 20.

Unfortunately, there are outstanding failure scenarios where reachability between the client devices, the CPE nodes 12, 14, that were locally switched is not maintained, such as a failure of the inter-PE link. This disclosure proposes a mechanism to address this problem, making the application of EVPN FXC and local switching more robust for network deployments.

Scenario Analysis

Figure 2:
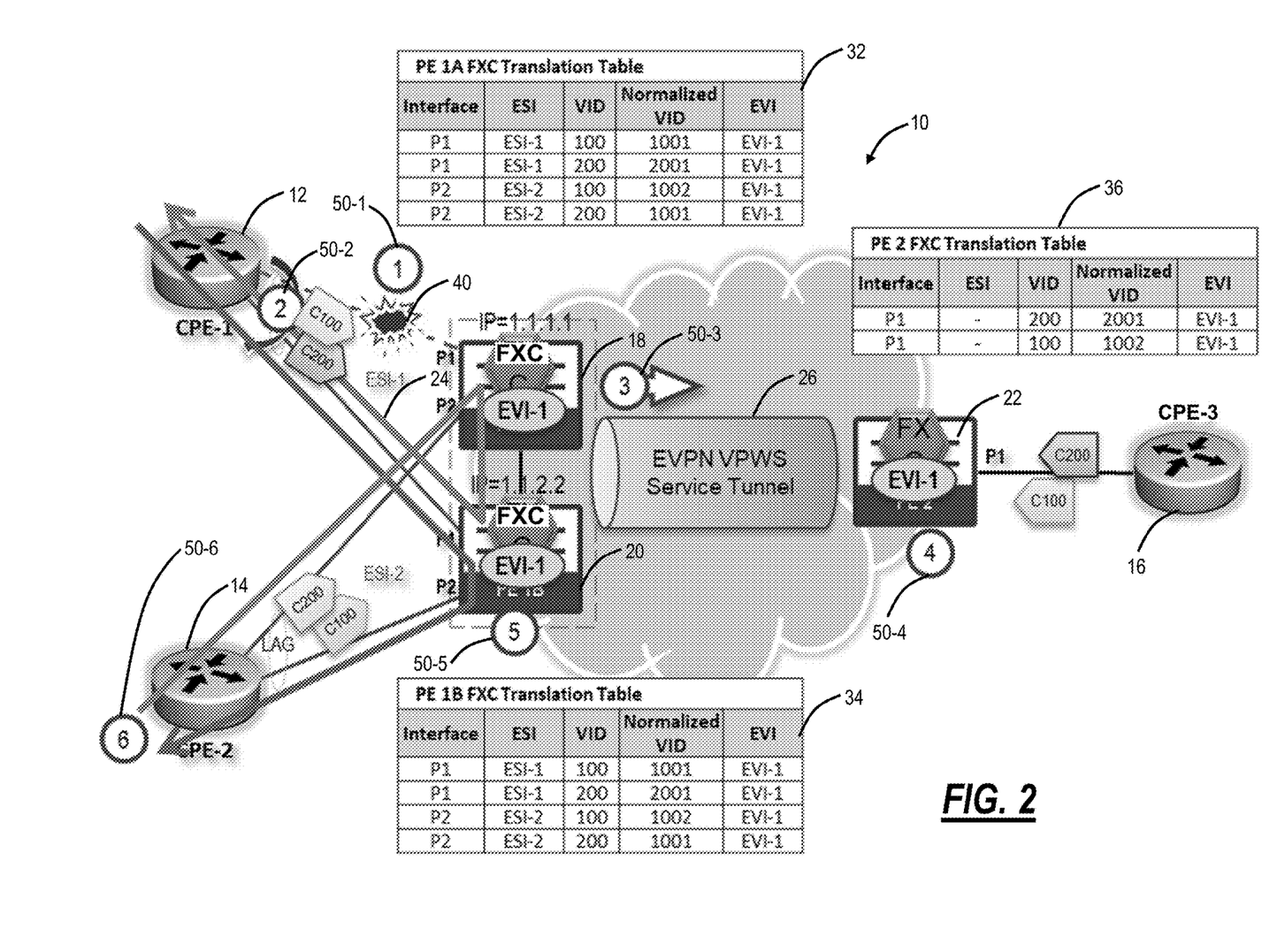
FIG. 2 is a network diagram of the network of FIG. 1 illustrating an attachment circuit failure.

For illustration purposes, the problem described above is shown through a few representative failure scenarios. FIG. 2 is a network diagram of the network 10 illustrating an attachment circuit failure 40. For example, if an attachment circuit fails (as illustrated in FIG. 2), connectivity between the CPE nodes 12, 14 can still be re-established.

An attachment circuit failure 40 occurs on the PE1A 18 port P1 (step 50-1), and the CPE node 12 LAG now distributes traffic (e.g., C100) over the other LAG member (towards PE1B 20) (step 50-2).

The PE1A 18 triggers the withdrawal of the Ethernet AD (per EVI) associated with normalized VIDs (i.e., N1001) for ESI-1, as well as triggering the withdrawal of the Ethernet AD (per ESI) routes associated with ESI-1 (step 50-3). The PE2 22, upon receipt of the Ethernet AD (per EVI) associated with normalized VID (i.e., N1001), will withdraw the PE1A 18 from its path-list (for that ESI) (step 50-4). C100 traffic from the CPE node 12 should arrive at PE1B 20 and get locally switched out port P2 towards the CPE node 14 (step 50-5). C200 traffic from the CPE node 14 could be sent to the PE1A 18—at the PE1A 18, local switching should not occur, since port P1 is down. Instead, it will get redirected toward PE1B 20, and at PE1B 200, the N1001 traffic will be locally switched out port P1 (step 50-6).

Figure 3:
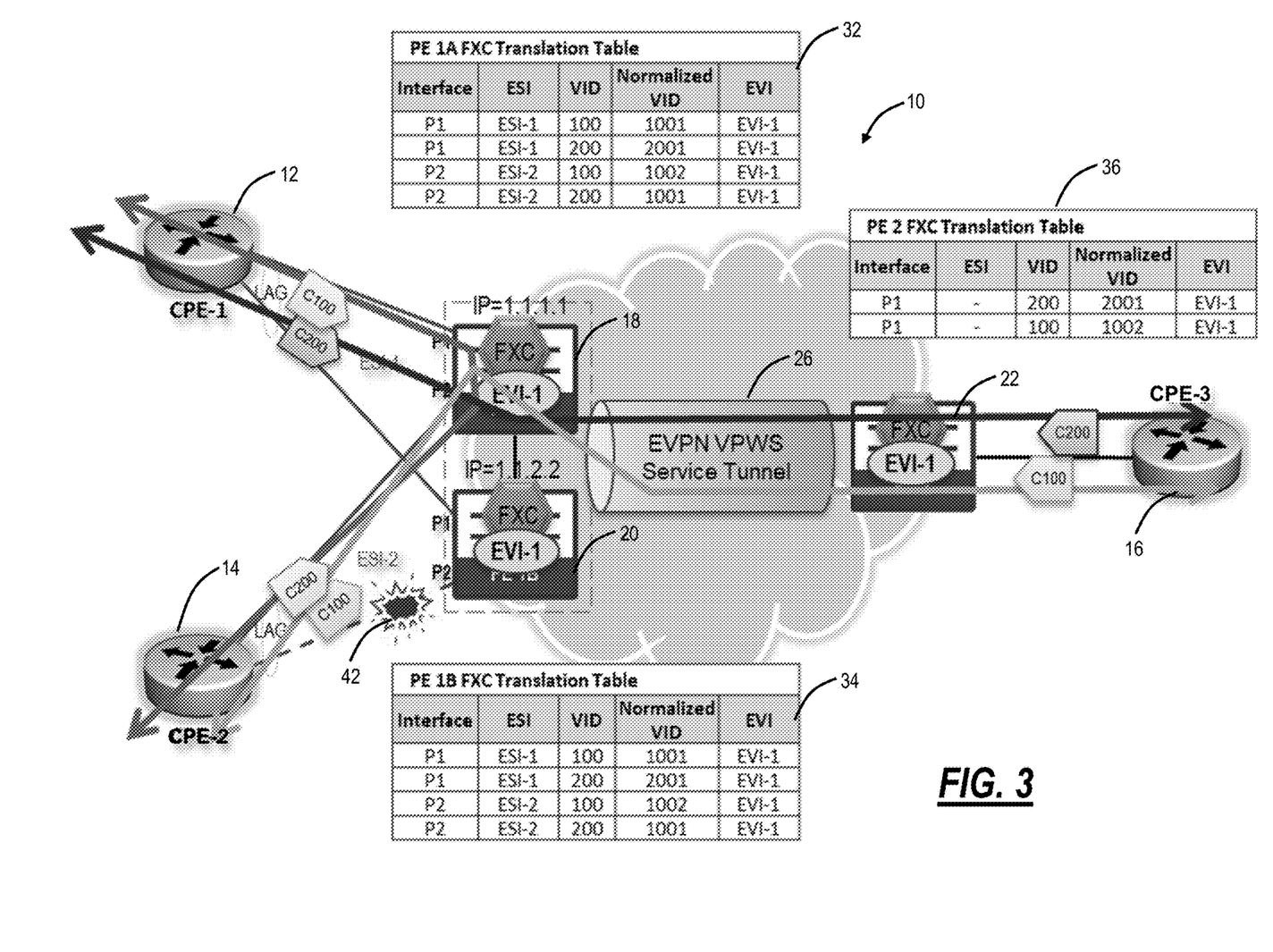
FIG. 3 is a network diagram of the network of FIG. 1 illustrating another attachment circuit failure.

Other attachment circuit failures are even simpler to address. FIG. 3 is a network diagram of the network 10 illustrating another attachment circuit failure 42. Here, once again, connectivity between the client devices can still be re-established. The attachment circuit failure 42 has no impact on the local switching scenario. This scenario is more of a fast convergence related to "mass withdraw" techniques used for VPWS service instance 1002.

Figure 4:
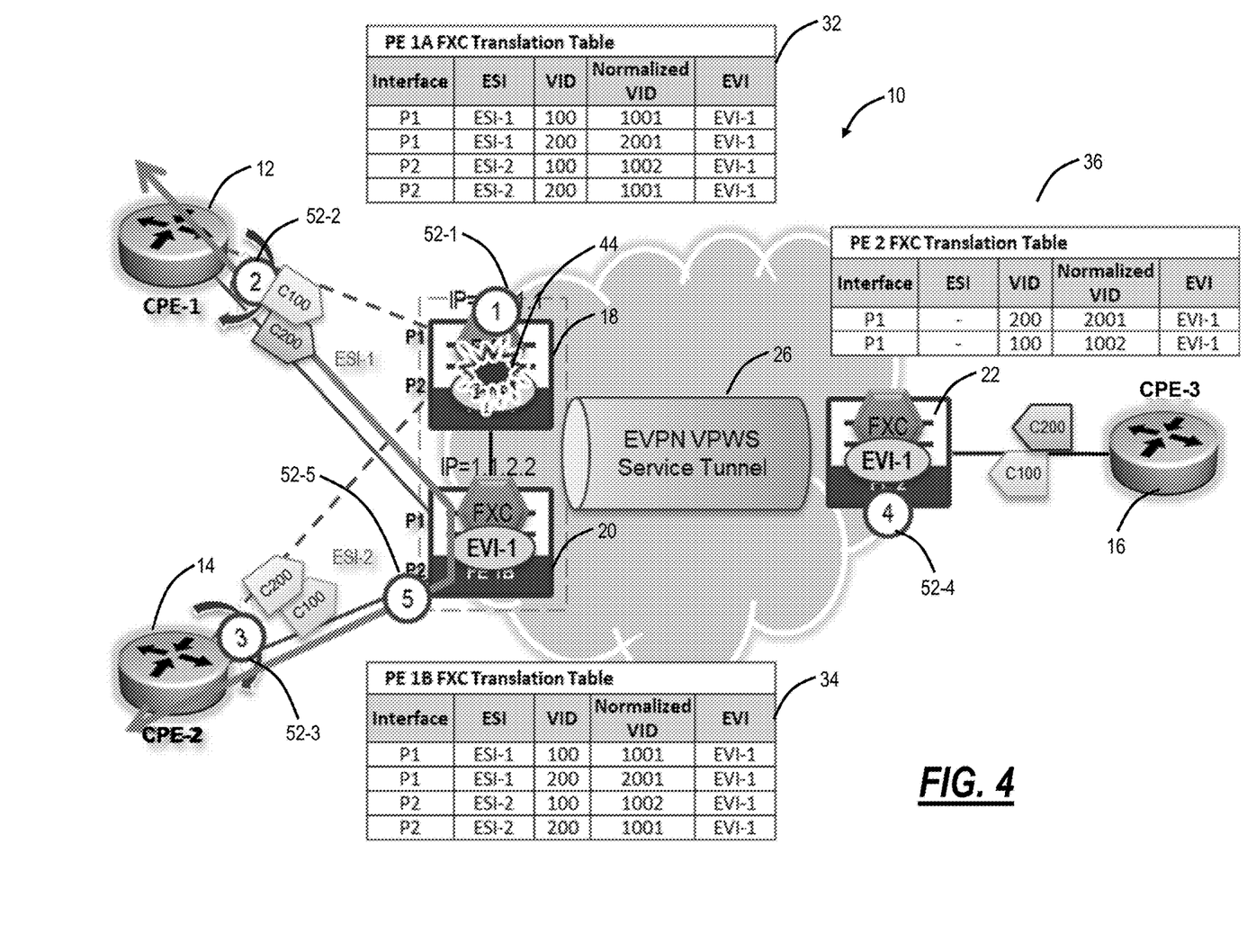
FIG. 4 is a network diagram of the network of FIG. 1 illustrating a nodal failure of the PE1A.

Scenarios involving a nodal (PE) failure are also currently handled. FIG. 4 is a network diagram of the network 10 illustrating a nodal failure 44 of the PE1A 18. The PE1A 18 can experience failure, and the connectivity between the CPE nodes 12, 14 is still re-established. A nodal failure 44 occurs at the PE1A 18 (step 52-1)—both ports P1, P2 are faulted. The CPE node 12 LAG now distributes traffic (e.g., C100) over the other LAG member (towards PE1B 20) (step 52-2) and the CPE node 14 LAG now distributes traffic (e.g., C200) over the other LAG member (towards PE1B 20) (step 52-3). It is assumed that each EVPN VPWS service tunnel is being monitored via EVPN Label Switched Path (LSP) Bidirectional Forwarding Detection (BFD). When EVPN LSP BFD for an EVPN service tunnel fails then this will trigger the PE2 22 to withdraw the PE1A 18 from its path-list (for that ESI) (step 52-4). C100 traffic from the CPE node 12 should arrive at the PE1B 20 and get locally switched out port P2 towards the CPE node 14 (step 52-5). C200 traffic from the CPE node 14 would also arrive at the PE1B 20 and get locally switched out port P1 towards the CPE node 12.

Representative Problem

Figure 5:
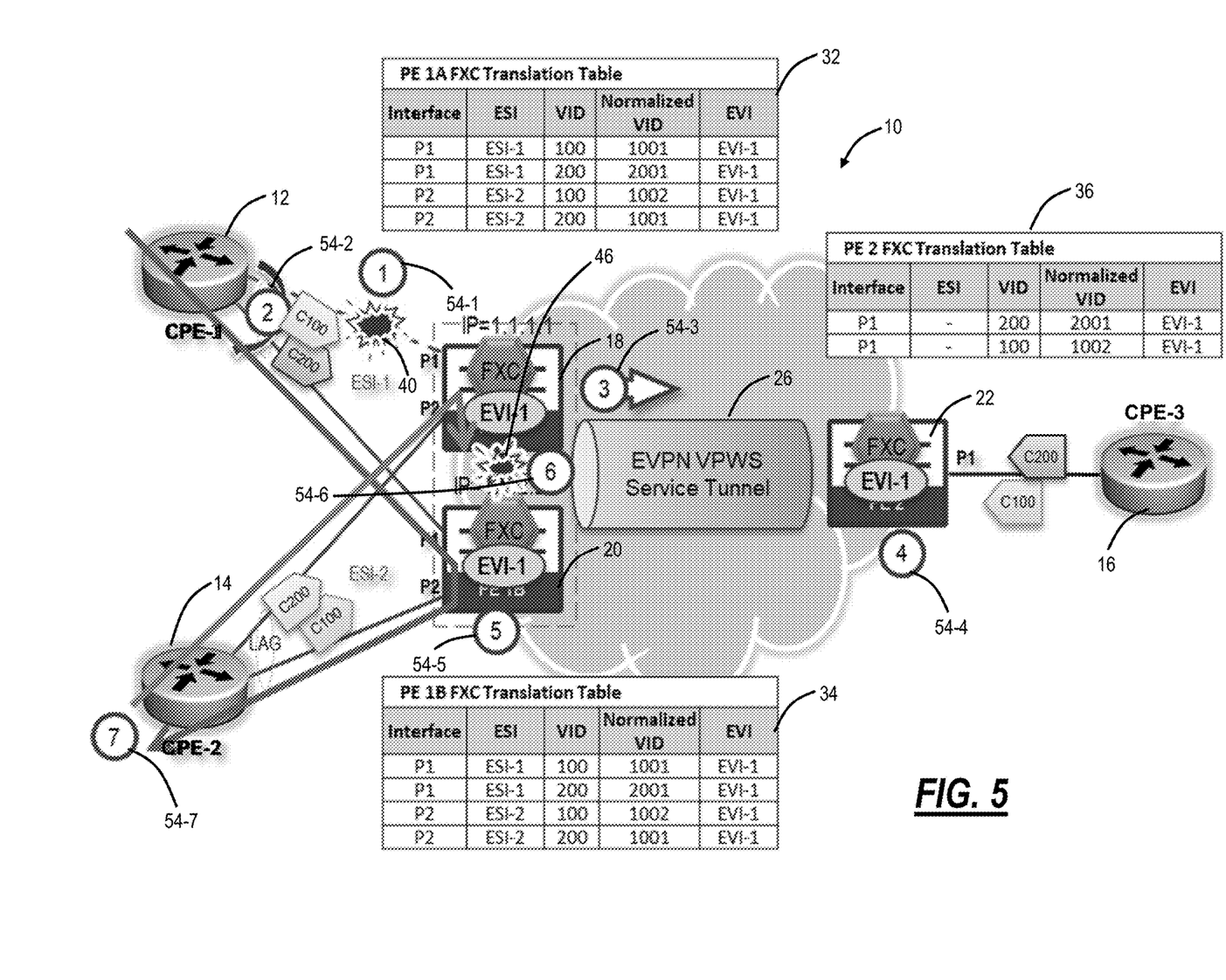
FIG. 5 is a network diagram of the network of FIG. 1 illustrating an attachment circuit failure and a failure on the inter-PE link that interconnects the nodes PE1A, PE1B.

Now to the representative problem scenario addressed herein. FIG. 5 is a network diagram of the network 10 illustrating the attachment circuit failure 40 and a failure 46 on the inter-PE link that interconnects the nodes PE1A 18, PE1B 20. The attachment circuit failure 40 occurs on PE1A 18 port P1 (step 54-1). The CPE node 12 LAG now distributes traffic (e.g., C100) over the other LAG member (towards PE1B 20) (step 54-2).

The node PE1A 18 triggers the withdrawal of the Ethernet AD (per EVI) associated with normalized VIDs (i.e., N1001) for ESI-1 (step 54-3), as well as triggering the withdrawal of the Ethernet AD (per ESI) routes associated with ESI-1. The node PE2 22, upon receipt of the Ethernet AD (per EVI) associated with normalized VID (i.e., N1001), will withdraw the PE1A 18 from its path-list (for that ESI) (step 54-4). C100 traffic from the CPE node 12 should arrive at PE1B 20 and get locally switched out port P2 towards the CPE node 14 (step 54-5). The failure 46 occurs on the inter-PE link that interconnects the nodes PE1A 18, PE1B 20 (step 54-6). At the node PE1B 20, the N1001 traffic will be locally switched out port P1—C200 traffic from the CPE node 14 could be sent to PE1A 18. At PE1A 18, local switching should not occur, since port P1 is down. Instead, an attempt will be made to redirected toward PE1B 20 (step 54-7). However, the inter-PE link is failed, thus the traffic cannot be delivered.

Service Providers are looking for EVPN FXC network solutions that can be deployable, and that can support all realizable failure scenarios where client traffic connectivity is able to be established. FIG. 5 illustrates a dual-fault scenario including a loss of an inter-chassis Provider Edge (PE) network link where traffic cannot be recovered.

The present disclosure provides a mechanism to address a gap in the current implementation of EVPN FXC networks.

EVPN FXC Fault Recovery

The present disclosure includes a mechanism where the PE device determines if any members of an Ethernet Segment (ESI) are out-of-distribution. If there are out-of-distribution members associated with an ESI, and if there is another ESI involved in a common VPWS service (i.e., normalized VID), then it will take that other member out-of-distribution as well.

So for example, using the simplified network reference illustrated in the network 10, if the inter-PE link fails between the nodes PE1A 18, PE1B 20, and if PE1A 18 determines that a member (i.e., port P1) associated with ESI-1 is out-of-distribution, it will take the members associated with the other ESIs (i.e., port P2 associated with ESI-2) out-of-distribution, since these ESIs are involved in the same VPWS service (i.e., normalized VID 1001).

Figure 6:
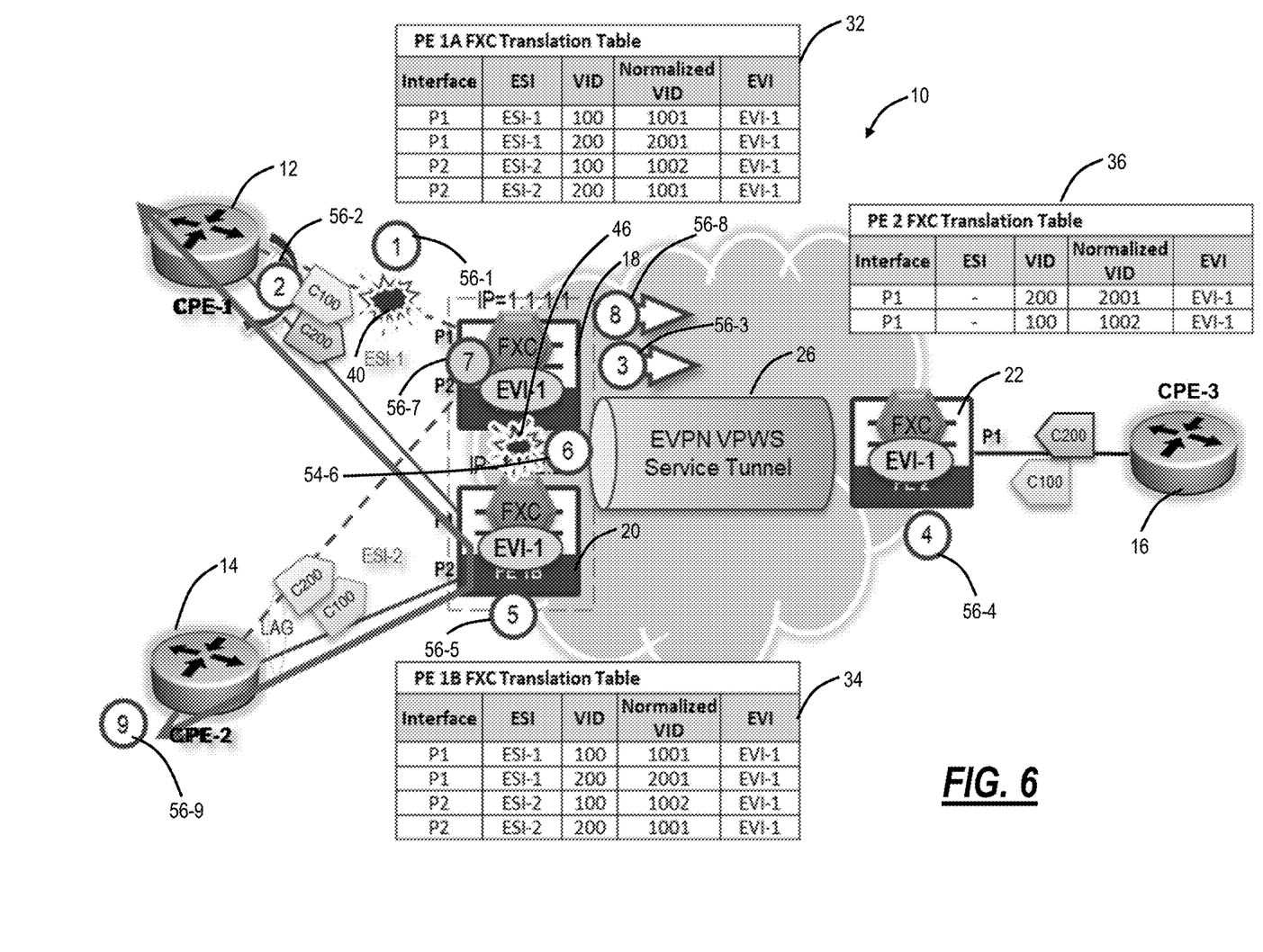
FIG. 6 is a network diagram of the network of FIG. 1 illustrating the attachment circuit failure and a failure on the inter-PE link that interconnects the nodes PE1A, PE1B, and an associated recovery mechanism.

FIG. 6 is a network diagram of the network 10 illustrating the attachment circuit failure 40 and a failure 46 on the inter-PE link that interconnects the nodes PE1A 18, PE1B 20, and an associated recovery mechanism. The attachment circuit failure 40 occurs on the PE1A 18 port P1 (step 56-1). The CPE node 12 LAG now distributes traffic (e.g., C100) over the other LAG member (towards PE1B 20) (step 56-2). The PE1A 18 triggers the withdrawal of the Ethernet AD (per EVI) associated with normalized VIDs (i.e., N1001) for ESI-1, as well as triggering the withdrawal of the Ethernet AD (per ESI) routes associated with ESI-1 (step 56-3).

The PE2 22, upon receipt of the Ethernet AD (per EVI) associated with normalized VID (i.e., N1001), will withdraw PE1A 18 from its path-list (for that ESI) (step 56-4). C100 traffic from the CPE node 12 should arrive at PE1B 20 and get locally switched out port P2 towards the CPE node 14 (step 56-5).

The failure 46 occurs on the inter-PE link that interconnects the nodes PE1A 18, PE1B 20 (step 54-6). Now, with the present disclosure, the PEs (e.g., PE1A 18, PE1B 20) check to see if any member are out-of-distribution. If there is an out-of-distribution member associated with an ESI, and if there is another ESI involved in a common VPWS service (i.e., normalized VID), then it will take that other member out-of-distribution as well (e.g., port P2 of ESI-2) (step 56-7).

The PE1A 18 triggers the withdrawal of the Ethernet AD (per EVI) associated with normalized VIDs (i.e., N1001) for ESI-2, as well as triggering the withdrawal of the Ethernet AD (per ESI) routes associated with ESI-1 (step 56-8). At the PE1B 20, the N1001 traffic will be locally switched, and C200 traffic from the CPE node 14 will be switched out to P1 towards the CPE node 12 (step 56-9).

Process

Figure 7:
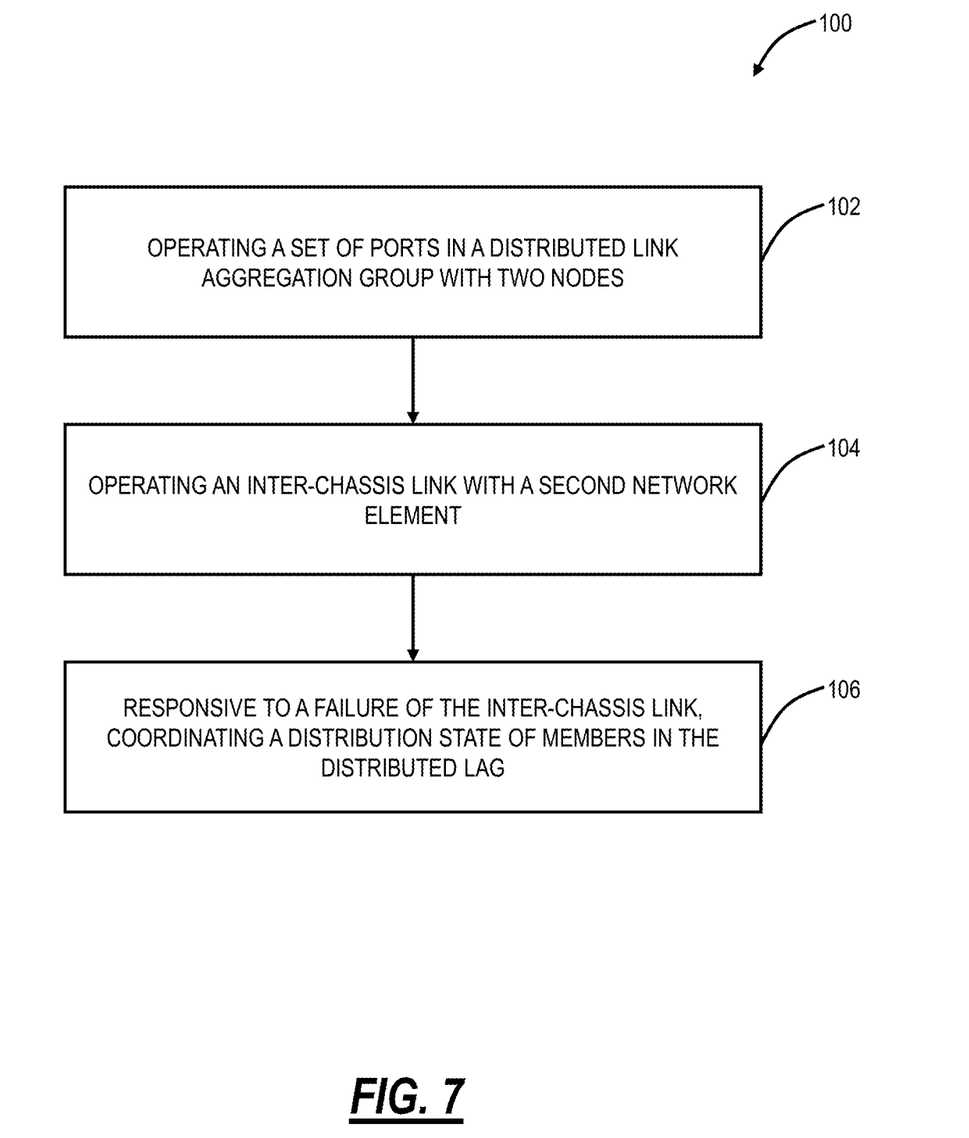
FIG. 7 is a flowchart of a process, implemented by a network element configured to implement an Ethernet Virtual Private Network (EVPN) Virtual Private Wire Service (VPWS) Flexible Cross-Connect (FXC) local switching service.

FIG. 7 is a flowchart of a process 100, implemented by a network element configured to implement an Ethernet Virtual Private Network (EVPN) Virtual Private Wire Service (VPWS) Flexible Cross-Connect (FXC) local switching service. The process 100 includes operating a set of ports in a distributed LAG with two nodes (step 102); operating an inter-chassis link with a second network element (step 104); and, responsive to a failure of the inter-chassis link, coordinating a distribution state of members in the distributed LAG (step 106). As described herein, the distribution state means how the distributed LAG is currently configured to distribute traffic on the associated links.

The distribution state can be coordinated based on the detection of a member being out-of-distribution. The distribution state can be coordinated based on detection of a member being out-of-distribution such that if one member of an Ethernet Segment Instance (ESI) being out-of-distribution causes another member with another ESI in a common VPWS to change to being out-of-distribution. The common VPWS can be based on a normalized Virtual Local Area Network (VLAN) Identifier (VID). The failure of the inter-chassis link can be subsequent to a fault affecting a port in the set of ports, where recovery occurs based on the distributed LAG. The recovery can occur based on the distributed LAG via withdrawal of Ethernet Auto-Discovery (AD) routes. Subsequent to the fault and the failure, corresponding traffic can be locally switched between the two nodes.

Network Element

Figure 8:
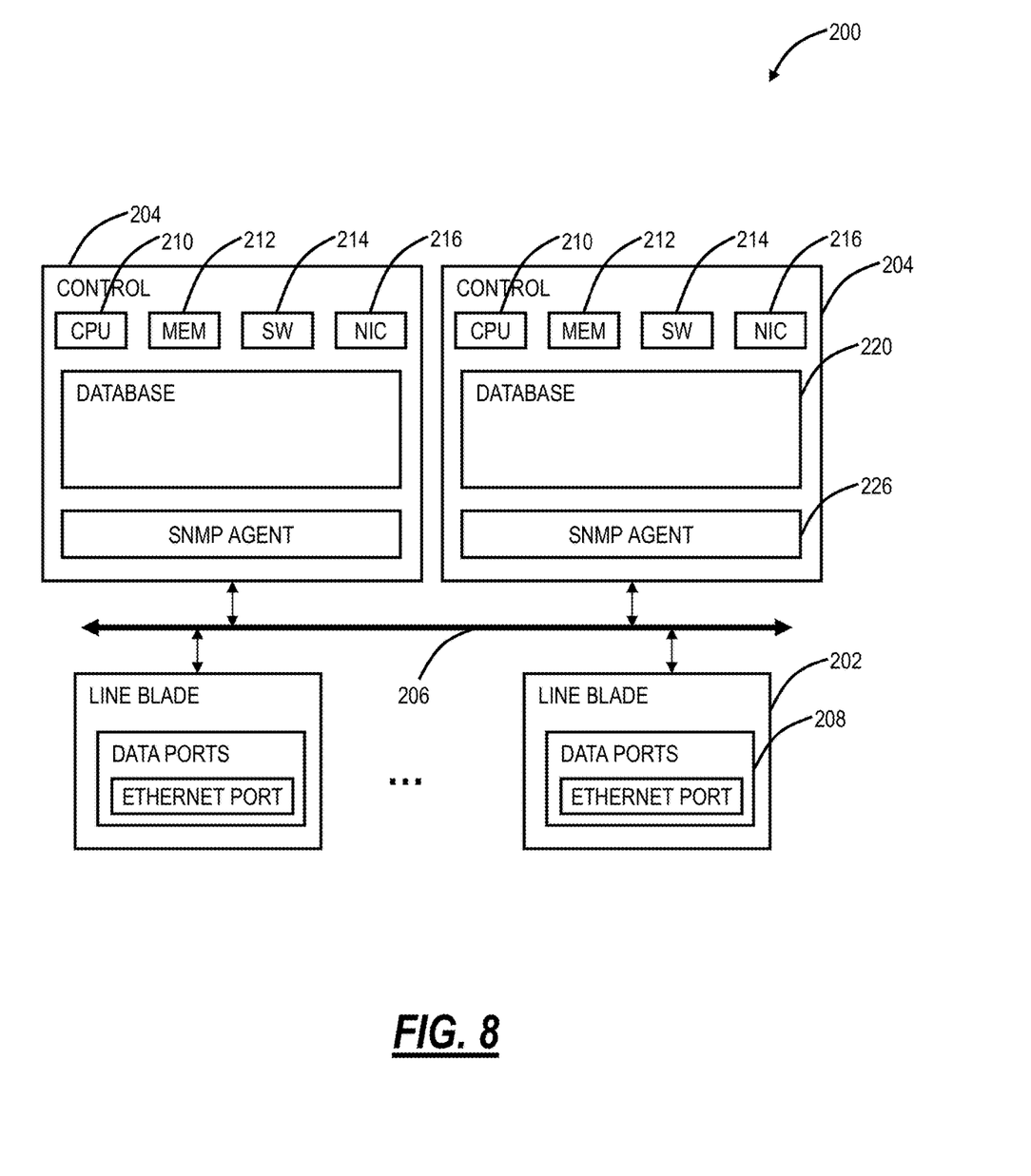
FIG. 8 is a block diagram of a network element such as for the PE1A, PE1B, PE2 in the network of FIGS. 1-6.

FIG. 8 is a block diagram of a network element 200, such as for the PE1A 18, PE1B 20, PE2 22 in the network 10. In this example embodiment, the network element 200 is an Ethernet network switch for illustration purposes, but those of ordinary skill in the art will recognize the systems and methods described herein contemplate other types of network elements and other implementations. In this embodiment, the network element 200 includes a plurality of blades 202, 204 interconnected via an interface 206. The blades 202, 204 are also known as line cards, line modules, circuit packs, pluggable modules, etc. and generally refer to components mounted within a chassis, shelf, etc. of a data switching device, i.e. the network element 200. Each of the blades 202, 204 may include numerous electronic devices and/or optical devices mounted on a circuit board along with various interconnects including, for example, interfaces to the chassis, shelf, etc. Two example blades are illustrated with line blades 202 and control blades 204. The line blades 202 generally include data ports 208, such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208, allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data, and the like. Further, the control blades 204 may include a Simple Network Management Protocol (SNMP) Agent 226 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200.

Note, the network element 200 may be a physical network device that provides network services, including EVPN VPWS FXC services. In other embodiments, the systems and methods described herein also contemplate operation with virtual devices performing network functions, such as Virtual Network Functions (VNFs) and the like. The virtual devices can provide similar functionality as the network element 200 but are realized in a virtualized environment such as operating on compute resources on a Virtual Machine (VM), software container, etc.

In an embodiment, the network element 200 is configured to implement an Ethernet Virtual Private Network (EVPN) Virtual Private Wire Service (VPWS) Flexible Cross-Connect (FXC) local switching service. The network element includes a plurality of ports; and a switching fabric configured to switch traffic between the plurality of ports; wherein the set of ports is configured in a distributed LAG with two nodes, and an inter-chassis link is configured with a second network element, and wherein, responsive to a failure of the inter-chassis link, a distribution state of members in the distributed LAG is coordinated.

The distribution state can be coordinated based on the detection of a member being out-of-distribution. The distribution state can be coordinated based on detection of a member being out-of-distribution such that if one member of an Ethernet Segment Instance (ESI) being out-of-distribution causes another member with another ESI in a common VPWS to change to being out-of-distribution. The common VPWS can be based on a normalized Virtual Local Area Network (VLAN) Identifier (VID). The failure of the inter-chassis link can be subsequent to a fault affecting a port in the set of ports, where recovery occurs based on the distributed LAG. The recovery can occur based on the distributed LAG via withdrawal of Ethernet Auto-Discovery (AD) routes. Subsequent to the fault and the failure, corresponding traffic can be locally switched between the two nodes.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element configured to implement an Ethernet Virtual Private Network (EVPN) Virtual Private Wire Service (VPWS) local switching service, the network element comprising:
   a plurality of ports; and a switching fabric configured to switch traffic between the plurality of ports;

wherein a set of ports is configured in a distributed Link Aggregation Group (LAG) with at least two nodes, and an inter-chassis link is configured with a second network element, and wherein, responsive to a failure of the inter-chassis link, a distribution state of members in the distributed LAG is coordinated utilizing a common VPWS that includes a plurality of members with different Ethernet Segment Instances (ESI) such that all of the plurality of members are configured with a same distribution state.

2. The network element of claim 1, wherein the distribution state is coordinated based on detection of a member being out-of-distribution.

3. The network element of claim 1, wherein the distribution state is coordinated by taking all the plurality of members of the common VPWS out-of-distribution when any of the plurality of members is out-of-distribution.

4. The network element of claim 3, wherein the common VPWS is based on a normalized Virtual Local Area Network (VLAN) Identifier (VID).

5. The network element of claim 1, wherein the failure of the inter-chassis link is subsequent to a fault affecting a port in the set of ports, where recovery occurs based on the distributed LAG.

6. The network element of claim 5, wherein the recovery occurs based on the distributed LAG via withdrawal of Ethernet Auto Discovery (AD) routes.

7. The network element of claim 5, wherein, subsequent to the fault and the failure, corresponding traffic is locally switched between the two nodes.

8. A method, implemented by a network element configured to implement an Ethernet Virtual Private Network (EVPN) Virtual Private Wire Service (VPWS) local switching service, the method comprising:

operating a set of ports in a distributed Link Aggregation Group (LAG) with at least two nodes;

operating an inter-chassis link with a second network element; and responsive to a failure of the inter-chassis link, coordinating a distribution state of members in the distributed LAG utilizing a common VPWS that includes a plurality of members with different Ethernet Segment Instances (ESI) such that all of the plurality of members are configured with a same distribution state.

9. The method of claim 8, wherein the distribution state is coordinated based on detection of a member being out-of-distribution.

10. The method of claim 8, wherein the coordinating includes taking all the plurality of members of the common VPWS out-of-distribution when any of the plurality of members is out-of-distribution.

11. The method of claim 10, wherein the common VPWS is based on a normalized Virtual Local Area Network (VLAN) Identifier (VID).

12. The method of claim 8, wherein the failure of the inter-chassis link is subsequent to a fault affecting a port in the set of ports, where recovery occurs based on the distributed LAG.

13. The method of claim 12, wherein the recovery occurs based on the distributed LAG via withdrawal of Ethernet Auto Discovery (AD) routes.

14. The method of claim 12, wherein, subsequent to the fault and the failure, corresponding traffic is locally switched between the two nodes.

15. A network configured to implement an Ethernet Virtual Private Network (EVPN) Virtual Private Wire Service (VPWS) local switching service, the network comprising:

a first network element and a second network element each in a distributed Link Aggregation Group (LAG), and with an inter-chassis link between the first network element and the second network element, wherein, responsive to a failure of the inter-chassis link, a distribution state of members in the distributed LAG is coordinated utilizing a common VPWS that includes a plurality of members with different Ethernet Segment Instances (ESI) such that all of the plurality of members are configured with a same distribution state.

16. The network of claim 15, wherein the distribution state is coordinated based on detection of a member being out-of-distribution.

17. The network of claim 15, wherein the distribution state is coordinated by taking all the plurality of members of the common VPWS out-of-distribution when any of the plurality of members is out-of-distribution.

18. The network of claim 17, wherein the common VPWS is based on a normalized Virtual Local Area Network (VLAN) Identifier (VID).

19. The network of claim 15, wherein the failure of the inter-chassis link is subsequent to a fault affecting a port in the distributed LAG, where recovery occurs based on the distributed LAG.

20. The network of claim 19, wherein the recovery occurs based on the distributed LAG via withdrawal of Ethernet Auto Discovery (AD) routes.

* * * * *